(12) United States Patent
Piszczek et al.

(10) Patent No.: US 7,917,810 B2
(45) Date of Patent: Mar. 29, 2011

(54) METHOD FOR DETECTING PROBLEMATIC DISK DRIVES AND DISK CHANNELS IN A RAID MEMORY SYSTEM BASED ON COMMAND PROCESSING LATENCY

(75) Inventors: Michael Piszczek, Laurel, MD (US); J. Gordon Manning, Ellicott City, MD (US); Thomas Pontos, Baltimore, MD (US)

(73) Assignee: Datadirect Networks, Inc., Chatsworth, CA (US)

( * ) Notice: Subject to any disclaimer, the term of this patent is extended or adjusted under 35 U.S.C. 154(b) by 624 days.

(21) Appl. No.: 11/907,722

(22) Filed: Oct. 17, 2007

(65) Prior Publication Data

US 2009/0106602 A1    Apr. 23, 2009

(51) Int. Cl.
*G06F 11/00* (2006.01)
(52) U.S. Cl. .............. 714/43; 714/27; 714/42
(58) Field of Classification Search .......... 714/27, 714/33, 42, 43
See application file for complete search history.

(56) References Cited

U.S. PATENT DOCUMENTS

| | | | | |
|---|---|---|---|---|
| 5,500,940 | A * | 3/1996 | Skeie | 714/25 |
| 5,768,501 | A * | 6/1998 | Lewis | 714/48 |
| 5,835,703 | A * | 11/1998 | Konno | 714/42 |
| 6,453,345 | B2 | 9/2002 | Trcka et al. | |
| 6,631,493 | B2 * | 10/2003 | Ottesen et al. | 714/774 |
| 7,127,668 | B2 | 10/2006 | McBryde et al. | |
| 7,389,396 | B1 * | 6/2008 | Goel et al. | 711/167 |
| 7,467,333 | B2 * | 12/2008 | Keeton et al. | 714/41 |
| 7,669,086 | B2 * | 2/2010 | Gower et al. | 714/43 |
| 2002/0129302 | A1 * | 9/2002 | Lee | 714/42 |
| 2003/0051195 | A1 * | 3/2003 | Bosa et al. | 714/43 |
| 2004/0098660 | A1 * | 5/2004 | Dong et al. | 714/776 |
| 2007/0174720 | A1 * | 7/2007 | Kubo et al. | 714/42 |
| 2008/0115014 | A1 * | 5/2008 | Vaidyanathan et al. | 714/42 |

OTHER PUBLICATIONS

E. Pinheiro, et al., "Failure Trends in a Large Drive Population",Proceedings of the 5th USENIX Conference on File and Storage Technologies, Feb. 2007.

* cited by examiner

*Primary Examiner* — Joshua A Lohn
(74) *Attorney, Agent, or Firm* — Rosenberg, Klein & Lee (57) ABSTRACT

In order to detect problematic drives in random arrays of independent disks, the system measures the latency of executing command sets which are broadcast to all disks in the data storage system and the results are compared to identify which disks take substantially longer to complete the requests. Disks that take longer to complete requests are likely to be problematic and are candidates for further examination and replacement. The disks in each tier group are compared to determine if any disk in that group exhibits problems. Also, counters for each tier group are compared to determine if the problem is with the disk or with the channel of the tier group. The latency of each disk in the tier group is saved in a table to provide a histogram of the latency of the disks in the tier group. Histograms of the disks in a single tier group are compared to determine if a specific disk is problematic. Histograms of each tier group are compared to determine if a specific disk is problematic or all the disks on the same channel exhibit problems.

19 Claims, 6 Drawing Sheets

FIG.4 s2A 9550[1]: stats disk

Delayed Disk Command Counts

|   | A  | B | C | D | E | F | G  | H | P | S |
|---|----|---|---|---|---|---|----|---|---|---|
| 1 | 30 | 0 | 0 | 0 | 0 | 0 | 0  | 0 | 0 | 0 |
| 2 | 0  | 0 | 1 | 0 | 0 | 0 | 10 | 0 | 0 | 0 |
| 3 | 0  | 0 | 0 | 0 | 0 | 0 | 0  | 0 | 0 | 0 |
| 4 | 0  | 0 | 0 | 0 | 0 | 0 | 0  | 0 | 0 | 0 |
| 5 | 0  | 0 | 0 | 0 | 0 | 0 | 0  | 0 | 0 | 0 |
| 6 | 0  | 0 | 0 | 0 | 0 | 0 | 0  | 0 | 0 | 0 |
| 7 | 0  | 0 | 0 | 0 | 0 | 0 | 0  | 0 | 0 | 0 |
| 8 | 0  | 0 | 0 | 0 | 0 | 0 | 0  | 0 | 0 | 0 |

Disks in the same tier should have similar results.

s2A 9550[1]:

FIG.5 s2A 9550[1]: stats tierdelay

Tier 1 Delay Statistics
Disk Channels

| Time seconds | A | B | C | D | E | F | G | H | P | S |
|---|---|---|---|---|---|---|---|---|---|---|
| 0.1 | 6968 | 1d02b | 1d031 | 1ce5f | 1d276 | 1d239 | 1d240 | 1d242 | 1d286 | 1d286 |
| 0.2 | 168f1 | 258 | 252 | 424 | d | 4a | 43 | 41 | 0 | 0 |
| 0.3 | 12 | 0 | 0 | 0 | 0 | 0 | 0 | 0 | 0 | 0 |
| 0.4 | 2 | 0 | 0 | 0 | 0 | 0 | 0 | 0 | 0 | 0 |
| 0.5 | 0 | 0 | 0 | 0 | 0 | 0 | 0 | 0 | 0 | 0 |
| 0.6 | 0 | 0 | 0 | 0 | 0 | 0 | 0 | 0 | 0 | 0 |
| 0.7 | 0 | 0 | 0 | 0 | 0 | 0 | 0 | 0 | 0 | 0 |
| 0.8 | 14 | 0 | 0 | 0 | 0 | 0 | 0 | 0 | 0 | 0 |
| 0.9 | 0 | 0 | 0 | 0 | 0 | 0 | 0 | 0 | 0 | 0 |
| 1.0 | 0 | 0 | 0 | 0 | 0 | 0 | 0 | 0 | 0 | 0 |
| 1.1 | 0 | 0 | 0 | 0 | 0 | 0 | 0 | 0 | 0 | 0 |
| 1.2 | 0 | 0 | 0 | 0 | 0 | 0 | 0 | 0 | 0 | 0 |
| 1.3 | 0 | 0 | 0 | 0 | 0 | 0 | 0 | 0 | 0 | 0 |
| 1.4 | 0 | 0 | 0 | 0 | 0 | 0 | 0 | 0 | 0 | 0 |
| 1.5 | 0 | 0 | 0 | 0 | 0 | 0 | 0 | 0 | 0 | 0 |
| 1.6 | 0 | 0 | 0 | 0 | 0 | 0 | 0 | 0 | 0 | 0 |
| 1.7 | 0 | 0 | 0 | 0 | 0 | 0 | 0 | 0 | 0 | 0 |
| 1.8 | 0 | 0 | 0 | 0 | 0 | 0 | 0 | 0 | 0 | 0 |
| 1.9 | 0 | 0 | 0 | 0 | 0 | 0 | 0 | 0 | 0 | 0 |
| >2.0 | 6 | 4 | 4 | 4 | 4 | 4 | 4 | 4 | 1 | 1 |

Hit enter to continue, 'e' to escape:

tier 2 Delay statistics
Disk channels

| Time seconds | A | B | C | D | E | F | G | H | P | S |
|---|---|---|---|---|---|---|---|---|---|---|
| 0.1 | 1dc4f | 1dc54 | 12320 | 1dc55 | 1dc57 | 1dc54 | d814 | 1d821 | 1dcb1 | 1dcb1 |
| 0.2 | 5d | 59 | b978 | 59 | 56 | 59 | 1046d | 489 | 0 | 0 |
| 0.3 | 0 | 0 | a | 0 | 0 | 0 | 18 | 0 | 0 | 0 |
| 0.4 | 1 | 1 | 1 | 0 | 1 | 1 | 2 | 1 | 0 | 0 |
| 0.5 | 0 | 0 | 0 | 0 | 0 | 0 | 0 | 0 | 0 | 0 |
| 0.6 | 0 | 0 | 0 | 0 | 0 | 0 | 1 | 0 | 0 | 0 |
| 0.7 | 0 | 0 | 0 | 0 | 0 | 0 | 0 | 0 | 0 | 0 |
| 0.8 | 0 | 0 | 1 | 0 | 0 | 0 | 7 | 0 | 0 | 0 |
| 0.9 | 0 | 0 | 0 | 0 | 0 | 0 | 0 | 0 | 0 | 0 |
| 1.0 | 0 | 0 | 0 | 0 | 0 | 0 | 0 | 0 | 0 | 0 |
| 1.1 | 0 | 0 | 0 | 0 | 0 | 0 | 0 | 0 | 0 | 0 |
| 1.2 | 0 | 0 | 0 | 0 | 0 | 0 | 0 | 0 | 0 | 0 |
| 1.3 | 0 | 0 | 0 | 0 | 0 | 0 | 0 | 0 | 0 | 0 |
| 1.4 | 0 | 0 | 0 | 0 | 0 | 0 | 0 | 0 | 0 | 0 |
| 1.5 | 0 | 0 | 0 | 0 | 0 | 0 | 0 | 0 | 0 | 0 |
| 1.6 | 0 | 0 | 0 | 0 | 0 | 0 | 0 | 0 | 0 | 0 |
| 1.7 | 0 | 0 | 0 | 0 | 0 | 0 | 0 | 0 | 0 | 0 |
| 1.8 | 1 | 1 | 2 | 0 | 1 | 1 | 2 | 1 | 0 | 0 |
| 1.9 | 0 | 0 | 0 | 0 | 0 | 0 | 1 | 0 | 0 | 0 |
| >2.0 | 3 | 2 | 8 | 3 | 2 | 2 | 9 | 3 | 0 | 0 |

Hit enter to continue, 'e' to escape:

Tier 3 Delay Statistics
Disk Channels
Page 1

Time

FIG.6

METHOD FOR DETECTING PROBLEMATIC DISK DRIVES AND DISK CHANNELS IN A RAID MEMORY SYSTEM BASED ON COMMAND PROCESSING LATENCY

FIELD OF THE INVENTION

The present invention relates in general to data processing systems, and in particular, to prediction of disk drives failure in data storage systems.

More in particular, the present invention is directed to detection of problematic disks (disk drives) at an early stages of degradation, so that the detected problematic disks may be scheduled for replacement before their failure in order to prevent degradation of the overall performance and/or reliability of a data storage system.

Additionally, the present invention takes advantage of measuring the latency of executing a command set broadcast to all of the disks of the storage system simultaneously and comparing the results to identify the disk drives which take substantially longer to complete the requests. Such disk drives are considered likely to be problematic and are candidates for further examination and replacement.

Still further, the present invention is directed to detecting problematic disk drives in the multithreaded parallel architecture of RAID (Random Array of Inexpensive (Independent) Disks) in which the command set is simultaneously sent to all disks within a tier storage group as well as to all tiers within the storage system to determine which disks may be problematic.

The present invention is further directed to a failure preventive system and method capable of detecting individual problematic disks, and/or problematic disk channels and/or a problematic behavior of the entire storage system. By comparing disk latencies in defined groupings of command sets, the present method and system identifies problematic disks in tier groups, problematic tier groups, problematic disk channels, as well as problematic system related issues.

BACKGROUND OF THE INVENTION

Computer systems generally employ disk drive devices for storage and retrieval of large amounts of data. Disk drives may degrade and their failure in large storage systems cause serious problems. Such failures are usually attributed to the defects in the recording media, failure in the mechanics of the disk drive mechanisms, failure in electrical components such as motors and servors, and failure in the electronic devices which are a part of the disk drive units, as well as a number of other attributable causes.

During the normal operation of disk drives whether now or previously operational such disk drives may have a number of failure modes which have been identified by the disk drive industry. Some failure modes initially present themselves as an inability to read and/or write data. These are reported to a user or host computer as error codes after a failed command. Some of the errors are the result of medium errors on magnetic disk platters, the surface of which can no longer retain its magnetic state.

As the density of data per square inch of information carriers such as disks, has increased greatly over the years, the susceptibility to errors caused by physical defects has become a greater problem to manufacturers. To combat these media issues, various predictive failure methods have been developed that identify potential failures and aggressively remove suspect areas of the magnetic media from use before the disk drive is released. There are, for example, algorithms that predict media failures due to surface scratches. These algorithms are usable at the time of fabrication but are likely to fail within the usable life of the disk drive. There are also algorithms in the drive software that create lists (aka G-list or grown defect list) of new defects that are detected during operational life of the disk drive.

However, a particular defect may not be timely identified and there may be a significant delay time before the defect is added to the defect list. For example, a drive may have a limit of 50 failed attempts to read a particular area in response to a single command from the host CPU before the media error is considered significant enough to be "mapped out" of the usable space on the drive. Therefore, one physical media area may be encountered a number of times and would still not trigger the G-list mechanism.

The industry has adopted error correction and detection algorithms in software and hardware that automatically correct errors in the data that are read from the media. The usual measure of reliability in a communication system such as for example a "bit error rate" becomes obscured when the errors are automatically corrected. As the process continues to evolve, one cannot rely on the internal mechanisms of the disk drive to identify potential data errors in a way that is timely enough to maintain a high through-put and high reliability system. By the time a single drive media error is corrected internally to the disk, the performance across the entire storage system may have already suffered significantly.

Early drive replacement rates in large scale storage systems are typically 2-4% with rates, possibly exceeding 10%. If a single drive with otherwise undetected media errors causes a performance degradation then storage systems that use multiple drives for logical units, such as in RAID systems, may be greatly impacted. The potential exists for the slowest component to dictate the maximum through put of the system which is unacceptable in industry.

The most common type of a driver array is the RAID (Redundant Array of Inexpensive (Independent) Drives). The RAID uses several inexpensive drives with a total cost which is less than the price of a high performance drive to obtain a similar performance with greater security. RAIDs use a combination of mirroring and/or striping for providing greater protection from lost data. For example, in some modifications of the RAID system, data is interleaved in stripe units distributed with parity information across all of the disk drives. RAID-6 system uses a redundancy scheme that can recover from a failure of any two disk drives. The parity scheme in the RAID utilizes either a two dimensional XOR algorithm or a Reed-Solomon code in a P+Q redundancy scheme.

Even utilizing the RAID architecture, for example, RAID-6, such systems while having the ability to detect failures in up to 2 disk drives, still need a mechanism of identifying a disk, and/or a disk storage channel in error. Without the ability to identify the problematic storage disk, the more fault tolerant parity algorithm of the RAID-6 system is unable to provide a satisfactory problem free performance. It is important to detect problematic disks while they are still "healthy" so that they can be scheduled for replacement to ensure that the stored data is not lost and that the overall performance of the storage system is not undermined.

The disk drive industry is currently using the Self-Monitoring, Analysis and Reporting Technology (SMART), to determine when a drive is likely to fail. Several of the SMART parameters do correlate well with determining when a drive is likely to fail. However, this technology often misses drives that require replacement. Most drives that fail in large systems are not detected by SMART since they report no SMART errors.

Therefore, there is a need in the industry for failure preventive tool to detect problematic disks in RAID storage systems which is more comprehensive and defect sensitive than the current technology.

SUMMARY OF THE INVENTION

It is therefore an object of the present invention to provide a method for early detection of problematic disk drives in parallel architecture RAID storage systems.

Another object of the present invention is to provide detection of problematic disks in RAID storage system by measuring the latency of the command set execution by the disks in the system and comparing the results to identify which disks have a delayed completion of the requests. These disks are considered candidates for further examination and replacement.

It is a further object of the present invention to provide detection of individual problematic disks, indication of channel problems, as well as detection of problems of the overall data storage system.

In the present method, detection of problematic disk storage devices in an array of independent disk storage devices is carried out by broadcasting a command set substantially simultaneously to a plurality of independent disk storage devices under study. A latency count of executing the command set by each of plurality of independent disk storage devices is acquired. A respective one of the plurality of independent disk storage devices is identified as a problematic disk storage device if the latency count thereof exceeds a predetermined latency value. This process is performed repeatedly at predetermined time intervals to monitor the state of the storage system.

The disk storage devices are arranged in a plurality of tier groups. Disk channels communicate data to/from the disks. Corresponding storage devices in all tier groups share a common disk channel. Preferably, a map of respective disk channels is produced to which the command set is broadcast, and the command set is translated to the disks through the disk channels simultaneously.

The common disk channel is identified as problematic if the corresponding disk storage devices in all tier groups of interest exhibit a latency count exceeding a predetermined latency value.

Upon acquiring the latency count, a latency table is built which reflects the acquired latency counts for each disk storage device. Further, another latency table is formed which includes a cumulative (or average) latency count for each tier group in the array. In each latency table, the acquired latency counts are grouped into predetermined time increments.

The present invention also constitutes a data storage system with enhanced capability of problematic disk storage device detection. In the present system, a plurality of independent disk storage devices are distributed in a plurality of tier groups in which corresponding disk storage devices are coupled to a common disk channel. A processor unit broadcasts a command set to the plurality of independent disk storage devices simultaneously through the plurality of disk channels.

A counter is coupled to the processor to calculate a latency count of executing the command set by each independent disk storage device, as well as an average (cumulative) latency count of executing the command set by each tier group.

A first latency table is built by the processor unit which reflects the latency counts for each disk storage device. A second latency table is formed by the processor unit which reflects the average (cumulative) latency count for each tier group. The processor unit identifies each disk storage device as a problematic disk storage device if the latency count thereof exceeds a predetermined latency value. In addition, the processor unit may identify a respective disk channel as a problematic one if the corresponding disk storage devices of the tier groups coupled to the same disk channel exhibit the latency count exceeding the predetermined latency value.

The features and advantages of the present invention will become apparent after reading a further description of the preferred embodiment in conjunction with accompanying patent drawings.

DESCRIPTION OF THE PREFERRED EMBODIMENT

Figure 1:
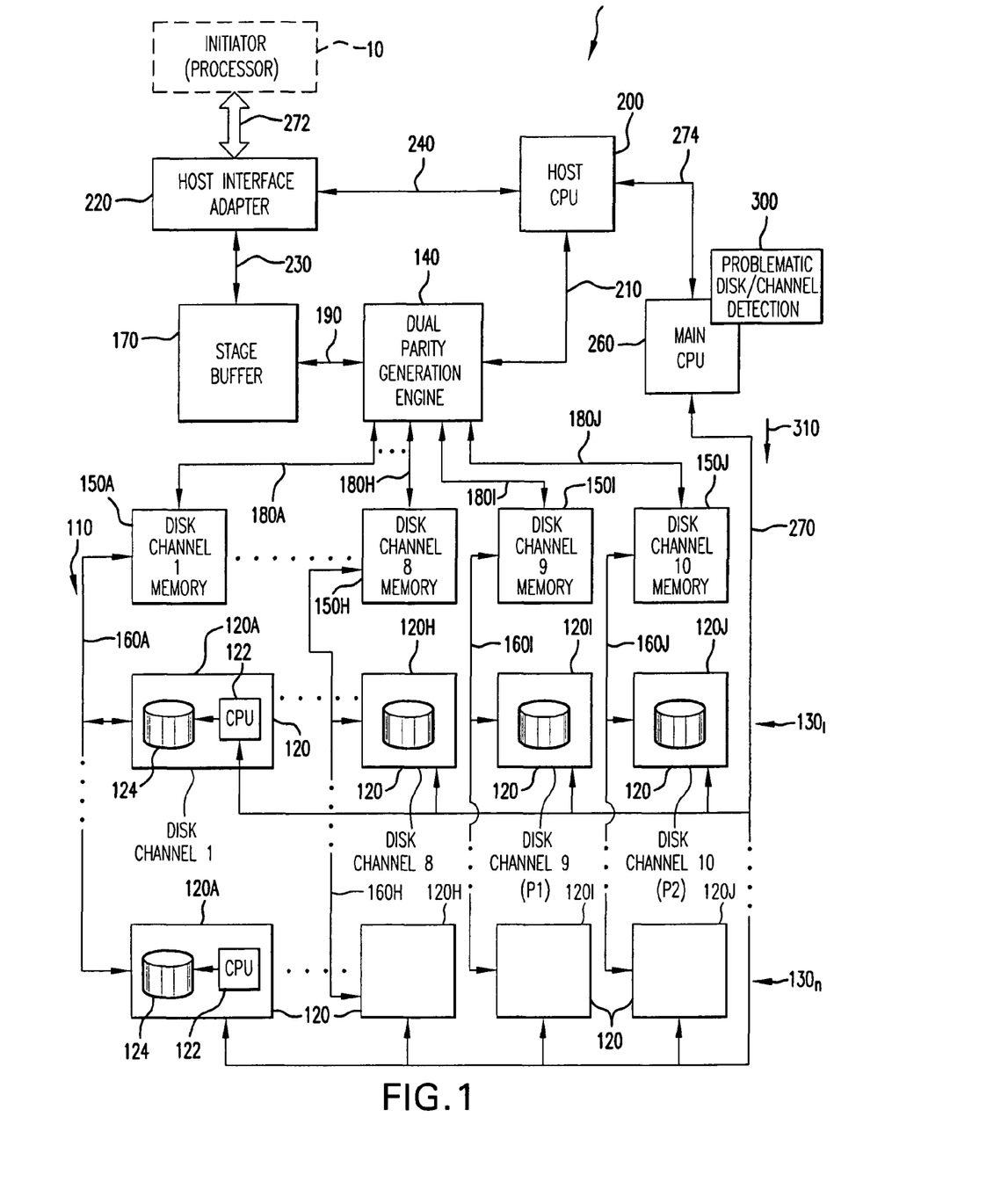
FIG. 1 is a block diagram illustrating the architecture of the memory system of the present invention.

Referring now to FIG. 1, there is shown memory system 100 for storing and retrieving data for use by one or more processors (initiators) 10. Although not restricted to any particular redundant array of independent disks (RAID), the capability of the memory system 100 to detect problematic disks is illustrated herein in conjunction with a RAID memory system, for example RAID 3/6, having multi-threaded parallel architecture described in detail in further paragraphs.

Memory system 100 includes a multidimensional array 110 of disk storage devices 120 distributed in read/write tier groups $130_1$-$130_n$ for storing data and parity values corresponding to the data stored in the array. Each tier group $130_1$-$130_n$ in the array 110 constitutes a multiplicity of data disk storage channels 1-8 which in the example illustrated herein, is formed by eight disk drives 120A-120H.

For simplicity, the following description pertains to the tier group $130_1$. However, the principles of design and operation of the tier group $130_1$ are also applicable to all tier groups $130_2$-$130_n$ in the scheme shown in FIG. 1. Data disk storage channels may be formed by a number of disk drives which are being chosen based on such factors as the data capacity for the memory system 100, cost, and reliability requirements.

While in a conventional RAID system, check data is stored in two logical parity drives of the system, in actuality, the parity data may be distributed in an interleaved fashion with the striped data across all of the drives of the array. Memory system 100 preferably stripes the data across the plurality of data disk storage channels 1-8, and reserves dedicated parity drives for storing the parity information. Utilizing the dual parity generation engine 140, the memory system 100 provides in each tier group $130_1$-$130_n$ two parity disk storage channels (channels 9 and 10) to provide two physical parity disk storage channels dedicated to parity data storage. As seen in FIG. 1, the array 110 of disk storage devices 120 includes at least two parity disk storage channels 120I and 120J in each tier group $130_1$-$130_n$ for storing check data corresponding to the data stripes stored in the plurality of disk storage drives 120A-120H.

The dual parity generation engine 140 may be a processor which implements a dual parity RAID software algorithm. The RAID algorithm is one of a conventional RAID type process such as a two-dimensional XOR algorithm or a Reed-Solomon P+Q algorithm having the ability to detect a failure of two of the plurality of disk storage channels 120A-120J. The dual parity generation engine may also be provided as hardware implementation of the particular dual parity RAID algorithm being utilized. Although the particular implementation of the dual parity generation engine and the dual parity RAID algorithm are not important to the inventive concepts, as herein described, a field programmable gate array implementing a two-dimensional XOR algorithm has been successfully utilized to implement the dual parity generation engine in one working embodiment of the present invention.

Each of the disk storage devices 120 includes a control central processing unit (CPU) 122 for controlling the operation of the disk storage media 124, which for simplicity of description are representatively shown only for the disk storage channel 120A of the tier group $130_1$ and for the corresponding disk storage channel 120A of the tier group $130_n$. Each of the disk storage channels 120A-120J of each tier group is coupled to a respective disk channel memory 150A-150J through a corresponding data bus 160A-160J. Each of the disk channel memories 150A-150J acts as a data cache for data being read from and written to the corresponding disk storage devices 120.

The disk channel memories 150A-150J may be separate and distinct dual port memories, or a single dual port memory which is divided into a plurality of subunits corresponding to the data strips for each of the disk storage channels. As may be seen in FIG. 1, the corresponding disk storage channels 120A-120J in the tier groups $130_1$-$130_n$ may share the respective disk channel memory 150A-150J. For example, the disk channel memory 150A is shared by the channels 120A in the tiers $130_1$-$130_n$ through the common data bus 160A.

The data read into the plurality of disk channel memories 150A-150J is read by a dual parity generation engine 140 and processed to determine the validity of the data. The data is further transferred to a stage buffer 170. The data read from the plurality of disk channel memories 150A-150J is transferred to the dual parity generation engine 140 by means of a corresponding data bus 180A-180J. The data transferred on each data bus 180A-180J includes the corresponding data read from the disk storage channels 120A-120J, plus additional parity bits added to enable detection of transmission errors between the disk channel memories 150A-150J and the dual parity generation engine 140.

The dual parity generation engine 140 transfers the data to the stage buffer 170 through a data bus 190 controlled and monitored by a host CPU 200 through a bus 210. Stage buffer 170 is a dual port memory which provides validated data to a host interface adaptor 220 through a direct memory access (DMA) bus 230. Host interface adaptor 220 under control of the host CPU 200, through the host interface control bus 240, provides the data read from the stage buffer 170 to the processor 10 through an interface bus 250.

Host interface adaptor 220 provides the bus conversion between the DMA bus 230 and the interface bus 250. Interface bus 250 may be a peripheral component interconnect (PCI) bus, a peripheral component interconnect extended (PCI-X) bus, a peripheral component interconnect express (PCIe) bus, a hyper transport (HTX) bus, or any other internal high speed communication bus appropriate for interfacing memory system 100 with one or more processors 10. Where memory system 100 is an external peripheral to a computer system or network, interface bus 250 may be a distributed bus such as Ethernet or fibre channel, or other high speed distributed bus architecture.

Main CPU 260 monitors and controls the operation of the plurality of disk storage channels 120A-120J of all the tier groups $130_1$-$130_n$ through disk control bus 270. As representatively shown with respect to disk storage channel 120A of the tier groups $130_1$-$130_n$, the main CPU 260 communicates with a CPU 122 of each respective disk storage device 120, in order to control the read and write operations from and to the disk storage media 124 of the respective disk storage device and monitor the status thereof. Main CPU 260 communicates with the host CPU 200 through the CPU control and communications bus 274, signaling the host CPU 200 when the read or write operations of the disk storage channels has been completed. Host CPU 200 controls the dual parity generation engine 140 through the bus 210 to test and transfer data from the plurality of disk channel memories 150A-150J to the stage buffer 170. After a transfer of valid data has been completed, the host CPU 200 instructs the host interface adaptor 220 to transfer the data from the stage buffer 170 to the initiator (processor) 10.

If the transfer status returned by the dual parity generation engine 140 to the host CPU 200 indicates that the data is invalid, host CPU 200 will begin the error recovery procedure which retries the original transfer from the plurality of disk channel memories 150A-150J through the dual parity generation engine 140 to the stage buffer 170. This retry of the transfer may repair most soft data errors and soft bus parity errors. If the retry does not produce valid data, the processor determines whether the disk storage channel in error is known, such as when there is a bus parity error, an identified defective disk storage device 120, or a disk storage device having known bad data which may occur when a new drive has been placed on-line which has not yet had its data rebuilt. When the disk storage channel in error is unknown, conventional RAID systems are only able to confirm that the data is not valid. In order to overcome that deficiency, host CPU 260 may include an auto-correction algorithm for instructing the dual parity generation engine to perform further tests on the data to try to identify the disk storage channel in error.

To further improve the performance, the system of the present invention is capable of detecting problematic elements of the storage system, such as problematic disk drives and/or channels, while they are still relatively "healthy" so that the disk drive or disk channel controller, etc. may be scheduled for replacement in order to avoid the corruption of data or data loss, as well as to prevent the problematic disks, controllers, and channels from degrading the overall performance and reliability of the entire storage system.

Detection of problematic disks and/or disk channels in the storage system 100 of the present invention is provided by the problematic disks detection algorithm 300 preferably residing in the main CPU 260. Thy algorithm 300 issues a command set 310 broadcast simultaneously to all of the disk storage devices 120 in the array 110, measuring the latency of the command sets 310 executed by each disk, and comparing the results to identify which disks take substantially longer to complete the requests. The algorithm 300 is designed on the assumption that the disks that take longer to complete requests are likely to be problematic and are considered as candidates for further examination and replacement.

Figure 2:
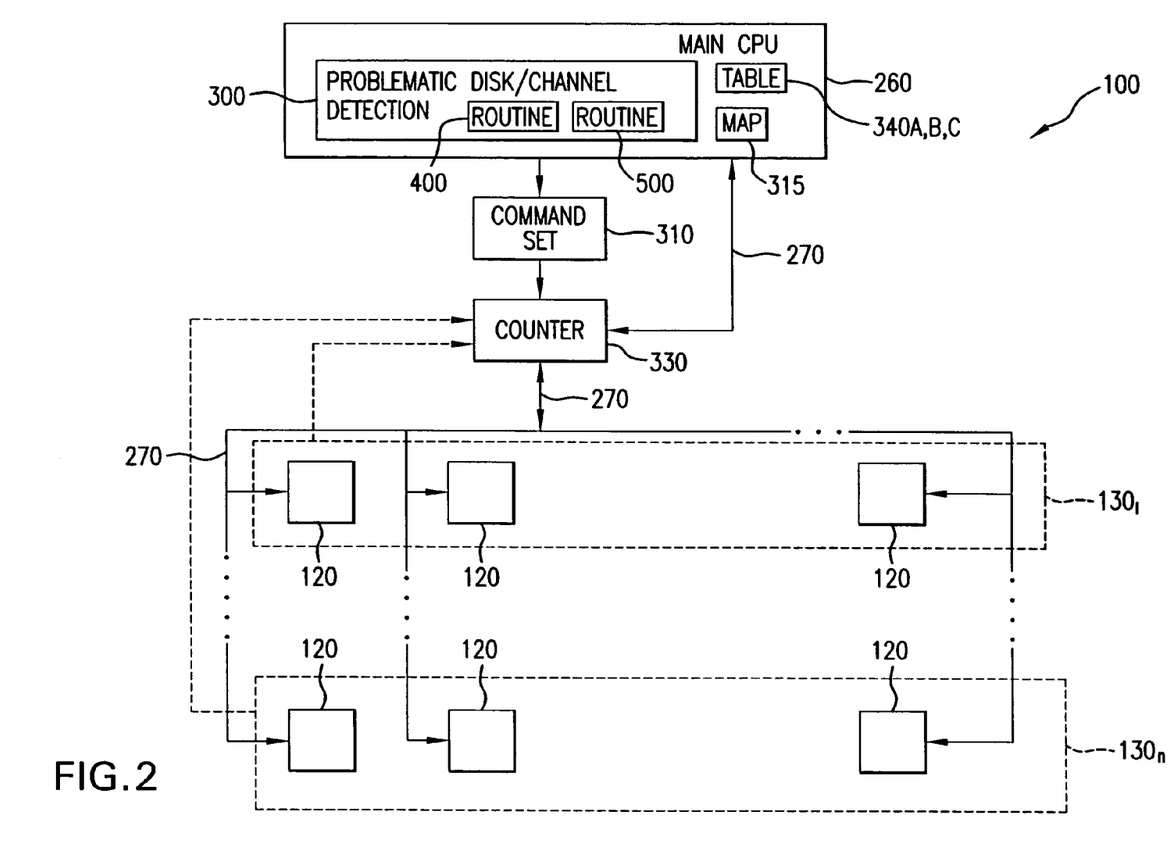
FIG. 2 is a simplified block diagram reflecting the principles of detecting problematic disks, communication channels, or entire system performance problems in accordance with the present invention.

FIG. 2 schematically represents a generalized concept underlying the detection of the problematic drives, and/or disk channels of the present invention.

In the storage system 100 where multiple requests are sent to a disk, the randomness of the commands and the reordering of the commands by the disks may hide trends in the latency. The present approach uses a parallel architecture of the RAID system to measure and compare the latency of multithreaded disk commands in a command set to determine which disks are problematic. This is only possible because in the multithreaded RAID architecture the disk commands are simultaneously sent to all disks in the array.

Referring to FIG. 2, the problematic disk/channel detection algorithm 300 of the present invention may reside in the main CPU 260 to broadcast a command set 310 to the disk storage devices 120 in the memory system 100. The algorithm produces a map 315 of the disk storage devices 120 and/or channels 120A-120J to which the command set is transmitted. The command set 310 is simultaneously applied to each disk storage device 120 through the disk control bus 270 for the command set execution. Latency of execution of the command set by each disk storage device 120 is measured by a counter 330 and is provided to the main CPU 260 where the latency counts are processed to compare the measured latencies of each storage disk device to identify the disk (or disks) with latency exceeding a predetermined value.

A Storage Area Network (SAN) device, including the counter 330, records a time when the command set is broadcast. The disks queue up the requests and completes them. The SAN device records the time when the disks complete the requests and then determines the latency of each disk for that command set. Since the latency of each disk is compared to the average (cumulative) latency of the entire command set, any disk (or disks) which executed the same command set with a substantially longer latency than the entire group average is recorded as a possible problematic disk.

The system of the present invention, in addition to detecting a problematic disk, also permits detection of a problematic disk channel. This may be accomplished based on an assumption that if all corresponding disks 120 sharing the same disk channel 120A-120J exhibit a problem, the problem may be accountable to the channel and not to the disk itself.

For this, the disks in each tier group are compared to determine if any disks in that group are exhibiting problems. Since the system 100 has multiple tier groups, the counters for each tier group (shown cumulatively as the counter 330) are compared to determine if the problem is really with the disk or if the same disk channel on different tier groups exhibit the same latency. This latter problem would possibly indicate a problem related to the disk communication channel and not the disk itself. For example, since multiple disk controllers may be used with the SAN device, and each controller may correspond to a single channel across all tier groups, the problem may be due to a poorly performing disk controller 122.

The present system for comparing disk latencies in defined groupings of command sets, is capable of identifying problematic disks in tier groups, problematic tier groups, problematic disk channels and problematic system related issues.

The latency of each disk in the tier group is saved into a table 340A to provide a histogram of the latency of the disks in the tier groups. Histograms of the disks in a tier group are compared to determine if a specific disk is problematic. Histograms of each tier group are compared to determine if a specific disk is problematic or all the disks on the same channel are exhibiting problems.

Additionally, the overall latency of the command set is saved in a table 340B to provide a histogram of the latency for the tier group. In the system 100 with multiple tier groups, these histograms of latency for each tier group may be compared to determine if any tier group has individual problems or if all of the tiers are exhibiting the same latency.

As a measure of the overall performance, the overall latency of the command set is saved in a table 340C to provide a histogram of the latency of all disk commands in the system. The information of the histogram can be examined to determine if over time the overall system behaves as expected.

Figure 3:
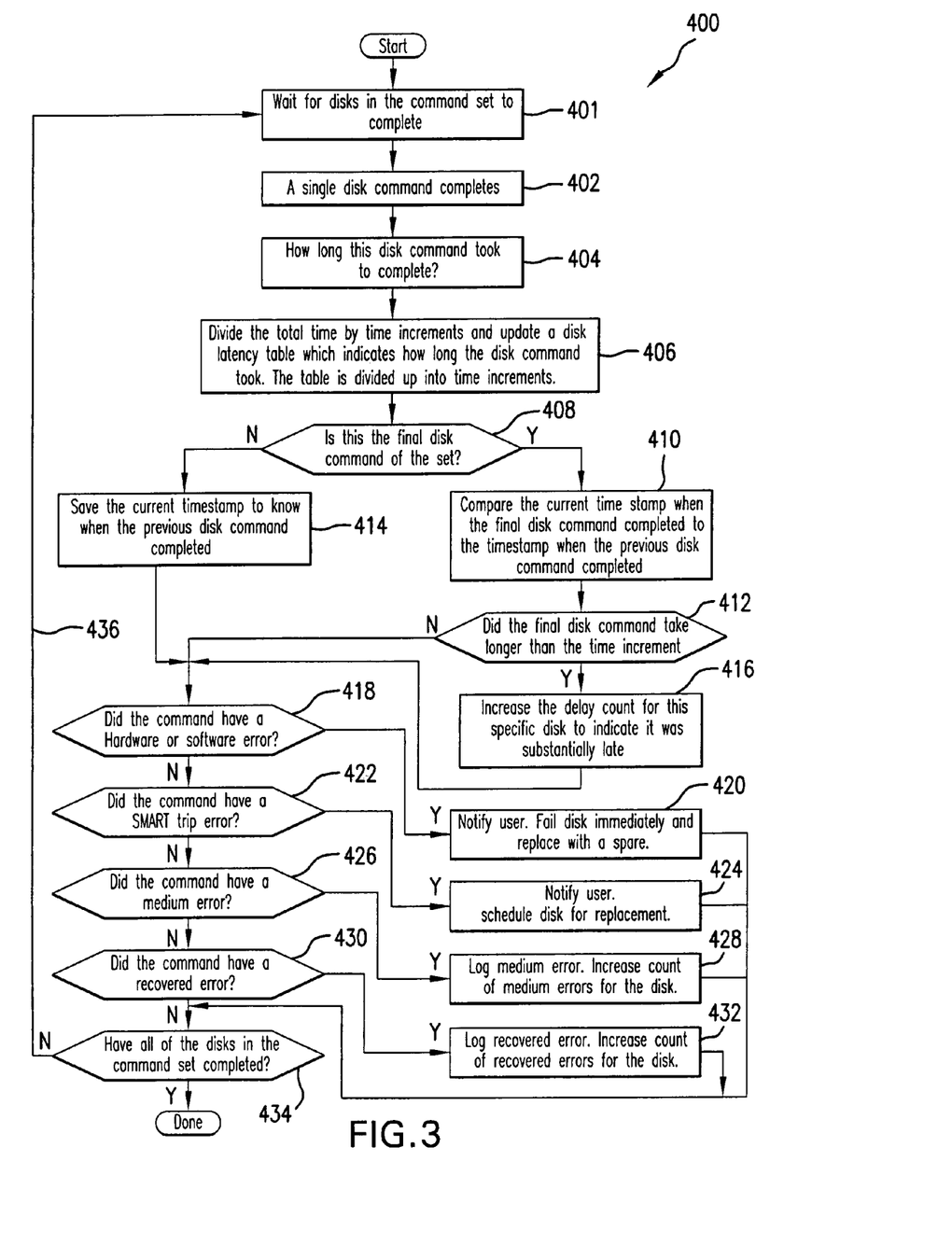
FIG. 3 is a flow-chart diagram of the process for detecting problematic disks by measuring the latency of the command set processed by the disks in the storage system presented in FIG. 1.

Referring to FIG. 3 a routine 400 for acquiring and analyzing data associated with a single disk command completion of the algorithm 300 is initiated in block 401 "Wait for Disks in the Command Set to Complete" in which the system is waiting for a command set to complete. The logic further flows to block 402 "A Single Disk Command Completes" in which the system records the time when the broadcast command set was executed by a disk of interest and identifies the time of the disk command completion with a time stamp.

From the block 402, the logic flows to the block 404 "How Long This Disk Command Took to Complete?", where the system compares the time stamp of the disk command set broadcasting with the current time stamp of the disk command completion to determine how long the disk command took to complete, e.g., the latency of the command set execution by the identified disk.

Further, upon determining how long the disk command took to complete, the logic flows to block 406 "Dividing the Total Time in predetermined Increments", where the time period determined in block 404 in the disk latency table is divided into time increments, for example, 100 msec, and the disk latency table is updated. Other time increments are also applicable in the present system.

The system cannot keep track of each individual disk command latency since it requires too much memory. To solve this problem, the present system groups the data corresponding to the disk latencies together in time increments, for example, in 100 msec increments. By dividing the latency by 100 msec, the system obtains an index into an array of counters. Index "0" is for commands representing latencies falling in the range 0-99 msec. Index "1" is for commands representing latencies in the range 100-199 msec, etc. If the disk command's latency is greater than a predetermined value, for example 299 msec, the table records it in a last index. The system then records the measured disk commands' latencies in the identified increments to build a histogram of the latency of each disk.

From block 406, the logic proceeds to decision block 408 "Is This the Final Disk Command of the Set?". If the disk executed all the commands in the broadcast command set, then the logic flows to block 410 in which the algorithm 300 compares the current time stamp of when the final disk command was completed to the time stamp when the previous disk command was completed. If, however, in block 408, the disk has not completed a final disk command of the set, the logic flows to block 414 where it saves the current time stamp to calculate when the previous disk command was completed.

From block 410, the procedure passes to block 412 to estimate whether the execution of the final disk command took longer than 100 msec for a disk. If the latency exceeds the predetermined time increment, for example, 100 msec, the logic flows to block 416 to increase the delay count for this specific disk by "1" to indicate a delayed execution of the command set for the disk.

If, however, the latency count in block 412 is shorter than 100 msec, the logic flows to decision block 418 "Did the Command Have a Hardware or Software Error?" These errors are errors that are reported by the disk. Hardware and software errors indicate serious problems with either the hardware or software which indicates the disk is unusable. If in block 418, the command execution does have a hardware or software error, the procedure follows to block 420 to notify a user and to replace the disk in question immediately with a spare disk.

If, however, in block 418, if the command does not have either hardware or software error, the procedure flows to decision block 422 to check whether the command has a SMART tip error. If "Yes", the present algorithm issues a command to notify a user in block 424 and to schedule the disk for replacement. If, however, in block 422, if the command does not have a SMART trip error, the logic flows to decision block 426 to determine whether the command has a medium error. If there is a medium error, the procedure logs the medium error in block 428 and increases the count of medium errors for the disk. If, in block 426, the command does not have a medium error, the procedure flows to block 430 to check whether the command has a recovered error. If the command has a recovered error, the system logs a recovered error in block 432 and increases the count of recovered errors for the disk.

A medium error is reported by a disk when it reads or writes data in its internal medium and discovers that the medium is corrupted and the data cannot be read or written reliably. Usually the disk will make several attempts to correct the data but if they all fail then it will report a Medium error to alert that data it is transferring is invalid.

If the disk is able to retry the transfer successfully or uses an error recovery algorithm to put the data back together, then it reports a recovered error. This indicates that the data is good but that the disk had trouble reading the data. The present system tries to repair these errors automatically but they are generally bad and indicate that the disk may need to be replaced. This generally provides a good indication that the disk is going to fail. The disks also count these types of errors and will trigger a SMART error if too many of the errors occur. The user may be notified of the errors logged in blocks 428 and 432.

If in block 430, the command does not have a recovered error, the logic proceeds to block 434 "Have all of the disks in the command set completed?" If "Yes", the procedure is considered to be completed. If "No", the logic loops to the block 401 through the route 436 for a subsequent command in the command set till the entire command set is completed.

Figure 4:
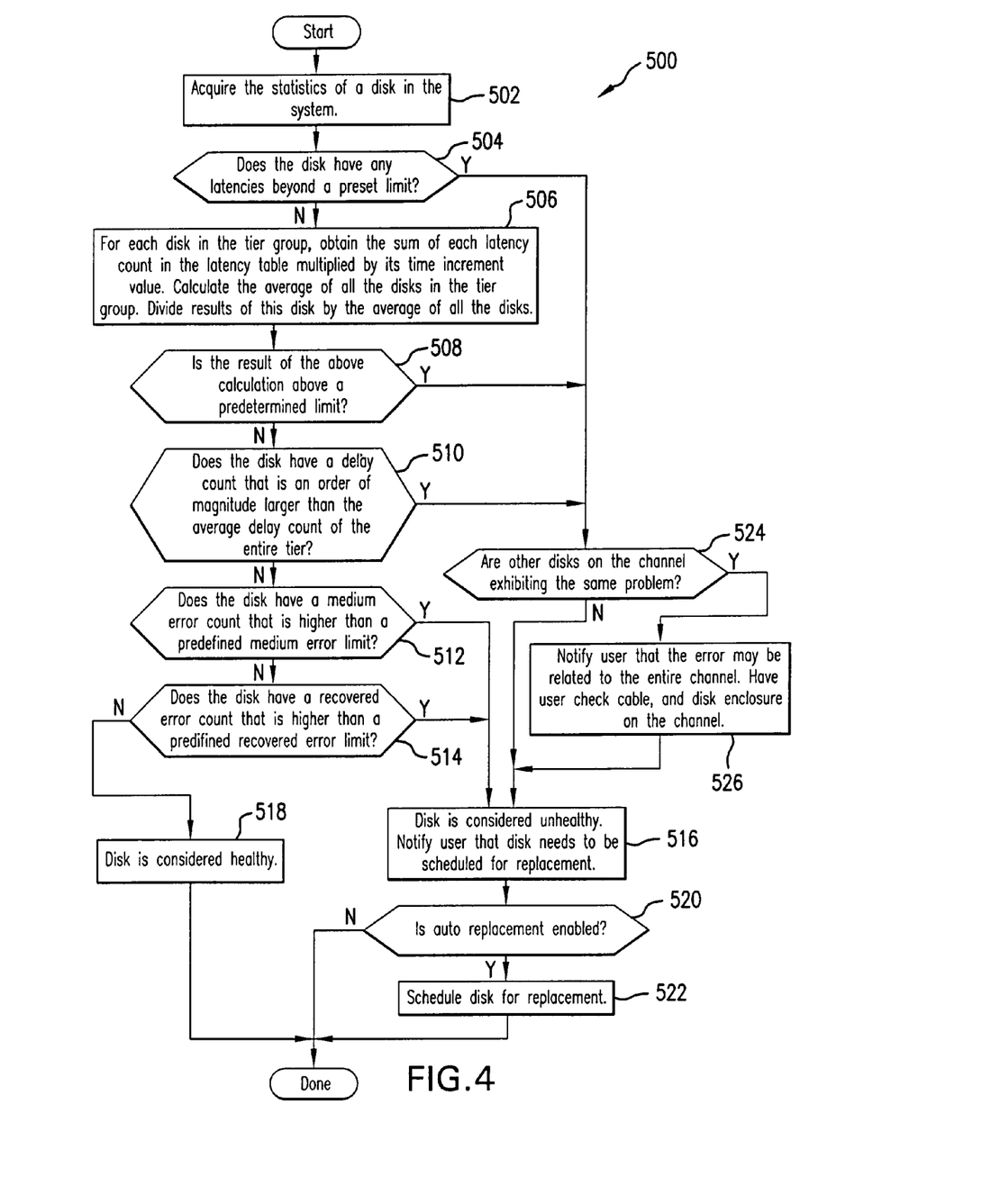
FIG. 4 is a flow-chart diagram of the periodic checking of the status of the disks in the storage system presented in FIG. 1.

Referring to FIG. 4, a periodic monitoring routine 500 of the algorithm 300, is repeatedly performed for periodic tests for checking the status of the disks in the storage system. The procedure 500 is initiated in block 502 "Acquire the Statistics of a Disk in the System". In this block, the data of the latency table created in blocks 404 and 406 of the procedure 400 shown in FIG. 3 is acquired. To analyze the latency table, the procedure flows from the block 502 to block 504 "Does the Disk Have any Latencies Beyond a Preset Limit?". If "Yes", the logic flows to block 524 "Are other disks on the channel exhibiting the same problem?" to check whether the corresponding disks in all tier groups connected to the same channel manifest the latency above the predefined value. If "Yes", the logic proceeds to block 526 to notify the user that the error may be related to the entire channel. The user thereby is prompted to inspect cable and disk enclosure on the channel.

If however, no latencies beyond a preset limit are found in block 504, the logic flows from block 504 to the unit 506 in which for each disk in a tier group, the sum of each latency count is obtained in the latency table multiplied by its predetermined time increments, for example, 100 msec value. In block 506, the average of all the disks in the tier group is calculated, and the latency of the disk is divided by the average of all the disks in the tier group.

Further the procedure flows to block 508 to check whether the result of the calculation in block 506 is above a predetermined limit. If "Yes", the logic flows to blocks 524 and 526 to examine other disks on the channel and to notify the user if needed.

If however, the results of the calculation in block 508 are below a predetermined limit, the logic flows to block 510. The delay count indicated in block 416 of FIG. 3 is used in block 510. The logic checks whether the disk has a delay count that is an order of magnitude larger than the average delay count of the entire tier. If "Yes", the procedure flows to block 524 to investigate the channel related problems.

If in block 524, other disks on the channel do not exhibit a problematic latency, the logic passes to block 516 to identify the disk as unhealthy and to schedule the same for replacement. Also, from block 526, the system flows to block 516 for the same purpose. If however, in block 510 the delay count is below that predetermined value, the procedure then flows to decision block 512. The medium error count identified in block 428 of FIG. 3 is used in block 512. The system checks whether the disk has a medium error count that is higher than a predefined medium error limit. If "Yes", the logic flows to block 516 to identify the disk in question as unhealthy for scheduling the same for replacement.

If however, in block 512, if the disk does not report such a medium error count the procedure follows to block 514. The recovered error count logged in block 432 of FIG. 3 is used in block 514. The logic investigates whether the disk has a recovered error count that is higher than a predefined recover error limit. If "Yes", the disk is considered unhealthy and is scheduled for replacement in block 516. If however, in block 514, the disk does not have a recovered error count that is higher than a predefined error limit, the logic flows to block 518 "Disk is Considered Healthy".

From block 516, the procedure passes to block 520 "Is Auto Replacement Enabled?". If "Yes", the disk is scheduled for replacement in block 522. If "No", the procedure is accomplished.

Figure 5:
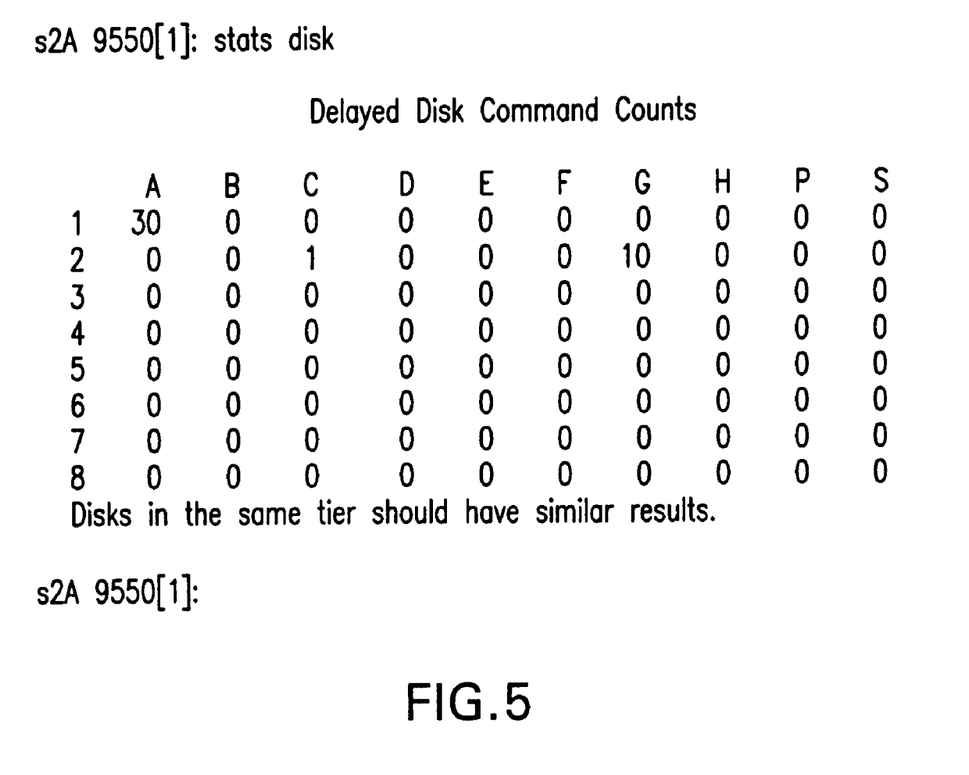
FIG. 5 represents the statistical information gathered into a delay count table for eight tiers.

Referring to FIG. 5 representing the statistical information which the present system gathers in the table 340A, the delay count for eight tiers of disks shows that disks 1A and 2G experience problems since they show increased command latency counts.

Figure 6:
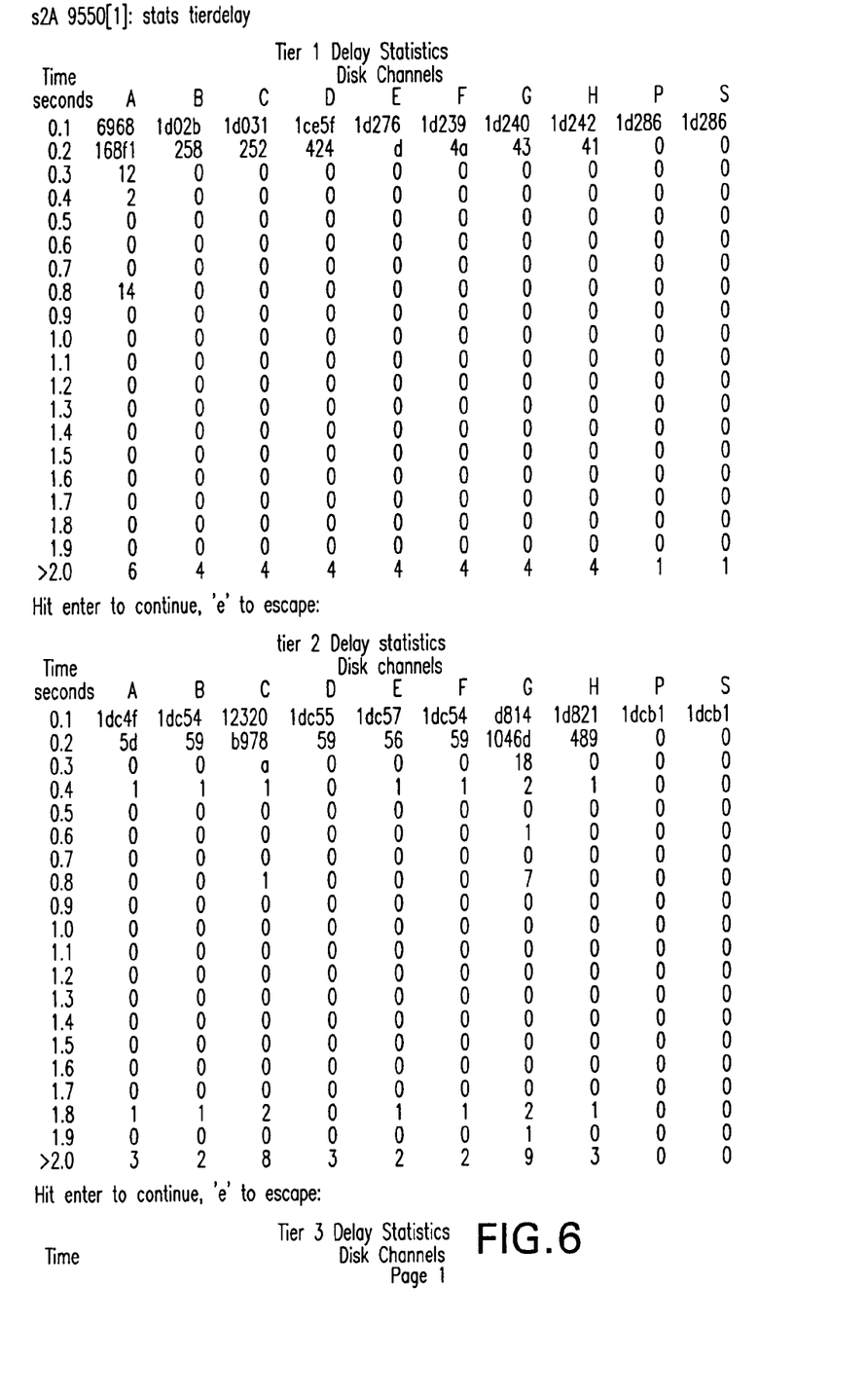
FIG. 6 represents the disk latency count table of all disks in an 8 tier system.

Referring to FIG. 6 showing the disk latency count combined in table 340B of all the disks in an 8 tier system (only two tier groups are presented) it can be seen that all of the disks in tiers 1 and 2 have large delays which the disks 1A and 2G have higher counts in the middle range. This correlates with the statistic information in the delay count example in FIG. 5.

The system of the present invention is extremely comprehensive for finding problematic disks in RAID substorage system. It may be used alone or to augment the SMART analysis technique and fill in the gaps where SMART does not seem to "catch" failing disks. For example the drives in the tier groups can provide a better method for predicting drive failures by matching the SMART error rate for certain drive statistics with the information gathered through the methods latency analysis. This failure analysis can lead to the system giving greater weight to any SMART failure mode that has a high correlation to the statistical sample of the system as a whole. Therefore, both the present prediction of problematic disks and SMART technique are desirable in the present system. The SMART models are more useful in predicting trends for large aggregate populations than for individual components. The present algorithm is perfectly applicable to predicting failures for both individual disks and tier groups, as well as in the entire system.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases particular applications of elements may be reversed or interposed, all without departing from the spirit or scope of the invention as defined in the appended claims.

What is claimed is:

1. A method for detecting problematic disk storage devices in an array of independent disk storage devices, comprising the steps of:
broadcasting a command set of any of read or write commands substantially simultaneously to a plurality of independent disk storage devices in the array thereof,
acquiring a latency count for each of said plurality of independent disk storage devices with respect to execution of said command set executed in common by each of said plurality of independent disk storage devices, and
identifying a respective one of said plurality of independent disk storage devices as a problematic disk storage device if said latency count thereof exceeds a predetermined latency value established as a function of latency values of said plurality of independent disk storage devices.

2. The method of claim 1, further comprising the steps of:
broadcasting successive command sets to said array of independent disk storage devices, and
monitoring said latency counts for each said independent disk storage device for each successive command set.

3. The method of claim 1, wherein said array of independent disk storage devices includes a plurality of disk channels, each disk channel corresponding to a respective one of said plurality of disk storage devices, the method further comprising the steps of:
producing a map of respective disk channels to which said command set is broadcast; and,
simultaneously broadcasting said command set through said respective disk channels.

4. The method of claim 3, further comprising the steps of:
measuring a duration of the execution of said command set at each of said plurality of disk channels.

5. The method of claim 1, further comprising the steps of:
indicating the issuance of said command set with an issuance time indicia,
indicating the completion of a first command in said command set with a first time indicia, and
calculating a duration of execution of said first command as the difference between said first time indicia and said issuance time indicia.

6. The method of claim 5, further comprising the steps of:
indicating the completion of each current command in said command set, subsequent to said first command with a completion time indicia,
calculating a duration of completion of each said command in said command set as a difference between the completion time indicia of the currently executed command and the previously executed command.

7. The method of claim 6, further comprising the steps of:
calculating said latency count of executing said command set for each said disk storage device by accumulating durations of completion of said first command and each said command in said command set when a final command in said command set is completed by each said disk storage device.

8. The method of claim 1, further comprising the step of:
upon acquiring said latency count, building a latency table reflecting said acquired latency counts for said each disk storage device.

9. The method of claim 8, further comprising the step of:
grouping said acquired latency counts into predetermined time increments.

10. The method of claim 1, further comprising the step of:
identifying said respective one of said plurality of independent disk storage devices as a problematic independent disk storage device if hardware or software errors thereof have been identified.

11. The method of claim 1, further comprising the step of:
identifying said respective one of said plurality of independent disk storage devices as a problematic independent disk storage device if Self-Monitoring, Analysis and Reporting Technology (SMART) related errors of said identified disk storage device have been identified.

12. The method of claim 1, further comprising the step of:
identifying said respective one of said plurality of independent disk storage devices as a problematic independent disk storage device if a storage medium error count above a limit value has been identified.

13. The method of claim 1, further comprising the step of:
identifying said respective one of said plurality of independent disk storage devices as a problematic disk storage device if a recovered error count above a limit value has been identified.

14. The method of claim 1, wherein said step of identifying a respective one of said plurality of independent disk storage devices as a problematic disk storage device includes the step of comparing said latency count of each of said plurality of independent disk storage devices with respect to execution of said command set to an average latency count for all of said plurality of independent disk storage devices executing said command set in common.

15. A method for detecting problematic disk storage devices in an array of independent disk storage devices, said array of independent disk storage devices including a plurality of disk channels, said array of independent disk storage devices further including at least a set of first and second tier groups of the disk storage devices, wherein corresponding disk storage devices in said set of at least first and second tier groups share a common one of said plurality of disk channels, the method further comprising the steps of:
producing a map of respective disk channels to which a command set is broadcast;
broadcasting said command set substantially simultaneously to a plurality of independent disk storage devices in the array through said respective disk channels
acquiring a latency count for said command set of said corresponding disk storage devices in said set of at least first and second tier groups,
identifying a respective one of said plurality of independent disk storage devices as a problematic disk storage device if said latency count thereof exceeds a predetermined latency value; and identifying said common disk channel as problematic if said corresponding disk storage devices in said set of at least first and second tier groups exhibit said latency count exceeding said predetermined latency value.

16. The method of claim 15, further comprising the step of:
subsequent to acquiring said latency counts, developing a latency table reflecting said acquired latency count for each of said set of at least first and second tier groups.

17. An array of independent disk storage devices with enhanced capability of problematic disk storage devices detection, comprising:
a plurality of independent disk storage devices distributed in at least a first tier group and a second tier group thereof, corresponding disk storage devices of said at least first and second tier group being coupled to a respective one of plurality of disk channels of said array;
a processor unit issuing a command set and broadcasting said command set to said plurality of independent disk storage devices simultaneously through said plurality of disk channels;
a counter unit coupled to said processor unit and calculating a latency count of executing said command set by each of said plurality of independent disk storage devices and a cumulative latency count of executing said command set by each of said at least first and second tier groups;
a first latency table built by said processor unit and reflecting said latency counts for said each disk storage device; and
a second latency table built by said processor unit and reflecting said cumulative latency count for each of said at least first and second tier groups;
wherein said processor unit analyzes said first latency table and identifies said each disk storage device as a problematic disk storage device if said latency count thereof exceeds a predetermined latency value, and
wherein said processor unit analyzes said second latency table and identifies said respective disk channel as a problematic one if said corresponding disk storage devices of said at least first and second tier groups exhibit said latency count exceeding said predetermined latency value.

18. A method for detecting problematic disk storage devices in an array of independent disk storage devices, comprising the steps of:
broadcasting a command set in common to a plurality of independent disk storage devices in the array;
acquiring a latency count for each of said plurality of independent disk storage devices executing said command set; and
identifying a respective one of said plurality of independent disk storage devices as a problematic disk storage device responsive to said latency count thereof exceeding any one of a plurality of latency performance values, at least one of said plurality of latency performance values being a value established relative to latency values of other of said plurality of independent disk storage devices.

19. The method of claim 18, wherein said step of identifying a respective one of said plurality of independent disk storage devices as a problematic disk storage device includes the step of comparing said latency count of each of said plurality of independent disk storage devices with respect to execution of said command set to a latency performance value based on an average latency count for all of said plurality of independent disk storage devices executing said command set in common.

* * * * *